United States Patent
Fan

(10) Patent No.: US 11,398,650 B2
(45) Date of Patent: Jul. 26, 2022

(54) BATTERY MODULE, CHARGING METHOD AND APPARATUS, ELECTRONIC DEVICE, AND READABLE STORAGE MEDIUM

(71) Applicant: BEIJING XIAOMI MOBILE SOFTWARE CO., LTD., Beijing (CN)

(72) Inventor: Jie Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 176 days.

(21) Appl. No.: 16/686,140

(22) Filed: Nov. 16, 2019

(65) Prior Publication Data

US 2021/0043985 A1 Feb. 11, 2021

(30) Foreign Application Priority Data

Aug. 7, 2019 (CN) .......................... 201910724478.1

(51) Int. Cl.
*H02J 7/00* (2006.01)
*H01M 10/44* (2006.01)
*H01M 10/42* (2006.01)

(52) U.S. Cl.
CPC ..... *H01M 10/441* (2013.01); *H01M 10/4257* (2013.01); *H01M 10/4264* (2013.01); *H01M 2010/4271* (2013.01); *H02J 2007/0067* (2013.01)

(58) Field of Classification Search
CPC .......... H01M 10/441; H01M 10/4257; H01M 10/4264; H01M 2010/4271; H01M 10/425; H01M 10/44; H01M 10/4207; H01M 10/484; H01M 10/00; H02J 2007/0067; H02J 9/061; H02J 7/0031; H02J 7/0063; H02J 7/345; H02J 7/00302; H02J 7/0029; H02J 7/00712; H02J 7/00; Y02E 60/10

See application file for complete search history.

(56) References Cited

U.S. PATENT DOCUMENTS

| | | | |
|---|---|---|---|
| 5,998,967 A * | 12/1999 | Umeki | H01M 10/4257 320/122 |
| 9,634,512 B1 | 4/2017 | Kim et al. | |
| 9,923,372 B2 * | 3/2018 | Ishigaki | H02J 3/32 |
| 10,811,886 B2 * | 10/2020 | Kim | H01M 10/4207 |
| 2010/0253287 A1 * | 10/2010 | Kim | H02J 7/0016 320/118 |

(Continued)

FOREIGN PATENT DOCUMENTS

CN 2686185 Y 3/2005
CN 1819395 A 8/2006

(Continued)

OTHER PUBLICATIONS

Supplementary European Search Report in the European application No. 19211884.2, dated Mar. 26, 2020.

(Continued)

*Primary Examiner* — Nghia M Doan
(74) *Attorney, Agent, or Firm* — Syncoda LLC; Feng Ma

(57) ABSTRACT

A battery module includes a first battery and a discharge circuit. The discharge circuit is connected in parallel to a positive electrode and a negative electrode of the first battery. The discharge circuit is configured to discharge the first battery according to a control signal during charging of the first battery.

5 Claims, 14 Drawing Sheets

(56) References Cited

U.S. PATENT DOCUMENTS

| | | | |
|---|---|---|---|
| 2011/0074354 A1 | 3/2011 | Yano | |
| 2011/0175575 A1 | 7/2011 | Wu et al. | |
| 2011/0199059 A1 | 8/2011 | Aradachi | |
| 2013/0015709 A1 | 1/2013 | Matsunaga | |
| 2014/0145504 A1* | 5/2014 | Kayama | H02J 7/007182 307/23 |
| 2014/0315047 A1* | 10/2014 | Cattin | H01M 10/425 429/7 |
| 2015/0102691 A1 | 4/2015 | Kollreutter | |
| 2016/0226288 A1 | 8/2016 | Kuroda et al. | |
| 2019/0033390 A1 | 1/2019 | Yamada | |

FOREIGN PATENT DOCUMENTS

| | | |
|---|---|---|
| CN | 105914805 A | 8/2016 |
| CN | 108281998 A | 7/2018 |
| CN | 108512261 A | 9/2018 |
| CN | 109121450 A | 1/2019 |
| CN | 109274140 A | 1/2019 |
| CN | 109473745 A | 3/2019 |
| EA | 28882 B1 | 1/2018 |
| EP | 2555374 A1 | 2/2013 |
| EP | 2777979 A2 | 9/2014 |
| EP | 3046209 A1 | 7/2016 |
| JP | 2001110457 A | 4/2001 |
| JP | 2006352970 A | 12/2006 |
| JP | 2010244844 A | 10/2010 |
| JP | 2011069720 A | 4/2011 |
| JP | 2017175705 A | 9/2017 |
| JP | 2018093563 A | 6/2018 |
| KR | 20140021904 A | 2/2014 |
| KR | 20180080938 A | 7/2018 |
| RU | 137161 U1 | 1/2014 |
| RU | 181344 U1 | 7/2018 |
| WO | 2019021099 A1 | 1/2019 |
| WO | 2019026013 A1 | 2/2019 |

OTHER PUBLICATIONS

Notice of Allowance of the Russian application No. 2019138454, dated Jun. 16, 2020.

International Search Report in the international application No. PCT/CN2019/111026, dated May 8, 2020.

Written Opinion of the International Search Authority in the international application No. PCT/CN2019/111026, dated May 8, 2020.

First Office Action of the Japanese application No. 2019-563235, dated Nov. 24, 2021.

First Office Action of the European application No. 19211884.2, dated Apr. 7, 2022.

Wang, Dezhi, Wu, Shousong, Ran, You, et al, Principle and use of battery, Beijing: China railway publishing house, Oct. 31, 1989, pp. 107 to 110.

* cited by examiner

BATTERY MODULE, CHARGING METHOD AND APPARATUS, ELECTRONIC DEVICE, AND READABLE STORAGE MEDIUM

CROSS-REFERENCE TO RELATED APPLICATION

This application claims priority to Chinese patent application No. 201910724478.1 filed on Aug. 7, 2019, the disclosure of which is hereby incorporated by reference in its entirety.

BACKGROUND

A battery typically includes a positive electrode material, a negative electrode material, a separator, and an electrolyte solution. During charging and discharging, the positive and negative electrodes may absorb and release ions in an electrolyte, thereby expanding and contracting themselves. With the development of a quick-charging technology, the charging current of a battery is getting larger and larger, and the electrolyte solution of the positive electrode of the battery may be excessively consumed, which will speed up expansion of the positive and negative electrodes, and rapidly reduce the density of ions or electrons in the electrolyte at the positive and negative electrodes to form a gate finally. After the gate is formed, the impedance of the battery may become large and the capacity may become small, resulting in a shortened charging time and poor durability, thereby affecting the life of the battery.

SUMMARY

Embodiments of the present disclosure relate to the technical field of charging, and more particularly to a battery module, a charging method and apparatus, an electronic device, and a readable storage medium.

According to a first aspect of embodiments of the present disclosure, a battery module is provided, which may include a first battery and a discharge circuit. The discharge circuit may be connected in parallel to a positive electrode and a negative electrode of the first battery. The discharge circuit may be configured to discharge the first battery according to a control signal during charging of the first battery.

According to a second aspect of the embodiments of the present disclosure, a charging method is provided for a battery module. The battery module may include a first battery and a discharge circuit. The discharge circuit may be connected in parallel to the first battery. The charging method may include the following operations.

A state parameter of the first battery is acquired.

Whether battery protection is needed is judged according to the state parameter.

When the battery protection is needed, a preset battery protection strategy is executed, the battery protection strategy including suspending charging of the first battery during charging and controlling the first battery to charge the discharge circuit.

According to a third aspect of the embodiments of the present disclosure, a charging apparatus is provided for a battery module. The charging apparatus may be applied to a battery module which may include a first battery and a discharge circuit. The discharge circuit may be connected in parallel to the first battery. The charging apparatus may include: a processor and a communication component coupled with the processor, and the processor is configured to:

control the communication component to to acquire a state parameter of the first battery;

judge whether battery protection is needed according to the state parameter; and when the battery protection is needed, execute a preset battery protection strategy, the preset battery protection strategy including suspending charging of the first battery during charging and controlling the first battery to charge the discharge circuit.

According to a fourth aspect of the embodiments of the present disclosure, an electronic device is provided, which may include the battery module as described in the first aspect, a processor and a memory for storing an instruction executable by the processor. The processor may be configured to execute the executable instruction in the memory to implement the operations of the method as described in the second aspect.

According to a fifth aspect of the embodiments of the present disclosure, a readable storage medium is provided, which may have stored an executable instruction which implements, when executed by a processor, the operations of the method as described in the second aspect.

It should be understood that the above general descriptions and detailed descriptions below are only some and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
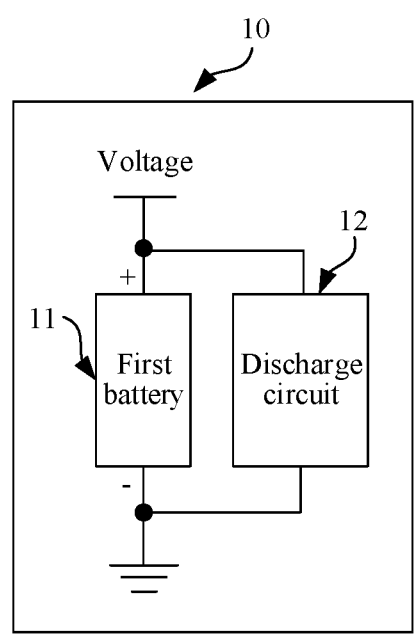
FIG. 1 is a block diagram of a battery module according to some embodiments of the present disclosure.

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the embodiments of the present disclosure. Instead, they are merely examples of devices consistent with aspects of the embodiments of the present disclosure as detailed in the appended claims.

Terms used in the present disclosure are only adopted for the purpose of describing specific embodiments and not intended to limit the present disclosure. "A/an" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first," "second," "third" and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, term "if" used here may be explained as "while" or "when" or "responsive to determining," which depends on the context.

A battery usually includes: a positive electrode material, a negative electrode material, a separator, and an electrolyte solution. During charging and discharging, the positive and negative electrodes may absorb and release ions in an electrolyte, thereby expanding and contracting themselves. With the development of a quick-charging technology, the charging current of a battery is getting larger and larger, and the electrolyte solution of the positive electrode of the battery may be excessively consumed, which will speed up expansion of the positive and negative electrodes, and rapidly reduce the density of ions or electrons in the electrolyte at the positive and negative electrodes to form a gate finally. After the gate is formed, the impedance of the battery may become large and the capacity may become small, resulting in a shortened charging time and poor durability, thereby affecting the life of the battery.

In order to solve the above technical problem, some embodiments of the present disclosure provide a battery module. A discharge circuit may be disposed in the battery module, and a battery in the battery module may be discharged through the discharge circuit during the charging process of the battery module, so that the electrolyte consumption and the expansion of positive and negative electrodes may be slowed down, thereby avoiding formation of a gate and ensuring the life of a battery.

FIG. 1 is a block diagram of a battery module according to some embodiments. Referring to FIG. 1, a battery module 10 includes a first battery 11 and a discharge circuit 12. The discharge circuit 12 may be connected in parallel between a positive electrode (indicated by "+") and a negative electrode (indicated by "−") of the first battery 11. Thus, the discharge circuit 12 may discharge the first battery 11 according to a control signal during charging.

Figure 2:
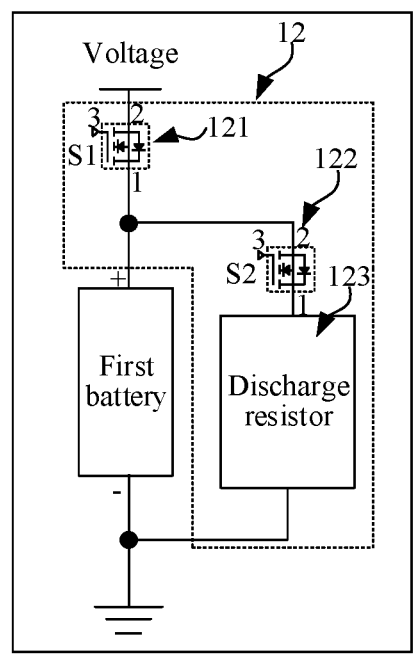
FIG. 2 is a circuit diagram of a battery module according to some embodiments of the present disclosure.

FIG. 2 is a circuit diagram of a battery module according to some embodiments.

Referring to FIG. 2, the discharge circuit 12 includes a first switching component 121, a second switching component 122 and a discharge resistor 123.

A first end (indicated by reference numeral 1) of the first switching component 121 may be connected to the positive electrode of the first battery 11, a second end (indicated by reference numeral 2) of the first switching component 121 may be connected to an object to be powered (not shown in the figure), a control end (indicated by reference numeral 3) of the first switching component 121 is configured to receive a first control signal, and the control end 3 may conduct, after receiving the first control signal, the first end 1 and the second end 2 to discharge or charge the first battery 11.

A second end (indicated by reference numeral 2) of the first switching component 122 may be connected to the positive electrode of the first battery 11, a first end (indicated by reference numeral 1) may be connected to a first end of the discharge resistor 123, and a control end (indicated by reference numeral 3) is configured to receive a second control signal. The control end 3 may conduct, after receiving the second control signal, the first end 1 and the second end 2 such that the first battery 11 charges the discharge resistor 123. The switching states of the second switching component 122 and the first switching component 121 are opposite.

A second end of the discharge resistor 123 may be connected to the negative electrode of the first battery 11.

The second switching component 122 and the first switching component 121 may have opposite switching states, that is, when the first switching component 121 is turned on, the second switching component 122 is turned off; or when the first switching component 121 is turned off, the second switching component 122 is turned on. If the first switching component 121 and the second switching component 122 are implemented by the same type of switching component, the first control signal may be opposite to the second control signal logically, that is, when the first control signal is a first level, the second control signal is a second level; and when the first control signal is a second level, the second control signal is a first level. In some embodiments, the first level may be a high level and the second level may be a low level.

It is to be noted that the first switching component 121 and the second switching component 122 may be implemented as a transistor, a field effect transistor or a circuit having a switching function in the related art, which is not limited in this application. In some embodiments, the first switching component 121 may be implemented as an NMOS transistor S1, and the second switching component 122 may be implemented as an NMOS transistor S2.

Continuing to refer to FIG. 2, the charging state of the battery module 10 may include the following situations.

When the first control signal is the first level, the first switching component 121 may be turned on to conduct the positive electrode of the first battery 11 and the object to be powered (or a power supply). The connection with the object to be powered is taken as an example here, in which the first battery 11 may supply power to the object to be powered.

The connection with the power supply is taken as another example, in which the power supply may charge the first battery 11. In this process, the second control signal may be the second level, and the second switching component 122 may be turned off.

When the first control signal is the second level, the first switching component 121 may be turned off; and when the second control signal is the first level, the second switching component 122 may be turned on to conduct the discharge resistor 123 and the positive electrode of the first electrode 11. In this case, the positive electrode of the first battery 11, the second switching component 122, the discharge resistor 123, and the negative electrode of the first battery 11 may form a current loop, and the first battery 11 may be discharged.

Taking the charging process as an example, the working process of the battery module 10 may include the following operations that: the first switching component 121 is turned on and the second switching component 122 is turned off, and in this case, the voltage at the second end of the first switching component 121 is higher than the voltage of the first battery 11, and the power supply charges the first battery 11.

During the charging process, the electrolyte loss rate at the positive electrode and the negative electrode of the first battery 11 is increased. It is to be noted that the electrolyte loss rate may be determined by a large number of experiments, which is not limited herein.

To reduce the electrolyte loss rate, the first switching component 121 may be turned off and the second switching component 122 may be turned on. In this case, an external power supply (such as a power grid or a mobile power supply) may no longer charge the first battery 11. The first battery 11 may be discharged through the second switching component 122 and the discharge resistor 123. Electrolytes at the positive and negative electrodes may be increased due to the opposite movement of ions in the electrolytes during discharging and charging.

Figure 3:
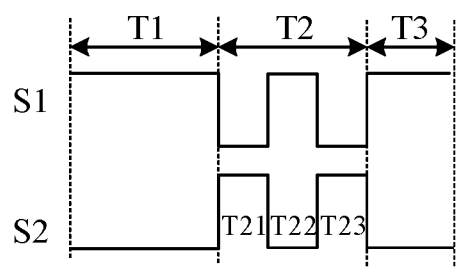
FIG. 3 is a timing diagram of a battery module according to some embodiment of the present disclosures.

In some embodiments, the first switching component 121 and the second switching component 122 may be described by taking an NMOS transistor as an example. Referring to FIG. 2 and FIG. 3, the working process of the battery module 10 is as follows.

Within time T1, the first control signal may be the high level to turn on the NMOS transistor S1, and the second control signal may be the low level to turn off the NMOS transistor S2, at which time the external power supply charges the first battery 11.

Within time T2, the first control signal may be a first pulse signal to turn on or turn off the NMOS transistor S1, and the second control signal may be a second pulse signal to turn off or turn on the NMOS transistor S2. The first pulse signal may be opposite to the second pulse signal, that is, it is ensured that only one of the NMOS transistor S1 and the NMOS transistor S2 is turned on at the same time. In the T21 phase, the first battery 11 may be discharged; in the T22 phase, the first battery 11 may be charged; and in the T23 phase, the first battery 11 may be discharged. Through constant charging and discharging, the electrolyte loss rate at the positive and negative electrodes may be kept stable, that is, the self-expansion at the positive and negative electrodes is no longer increased.

The duty ratio of the first pulse signal may be set according to a specific scenario. For example, the duty ratio needs to ensure that the power of the first battery 11 is continuously increased.

It is to be noted that T1 and T2 may be set according to empirical values or set according to big data statistics. In some embodiments, T1 may be the length of time consumed by a constant voltage charging phase, and T2 may be the length of time consumed by a constant current phase.

It is also to be noted that the time T3 in FIG. 3 may be understood as the process of discharging the battery module 10 outward after the completion of charging, and will not be described here.

Figure 4:
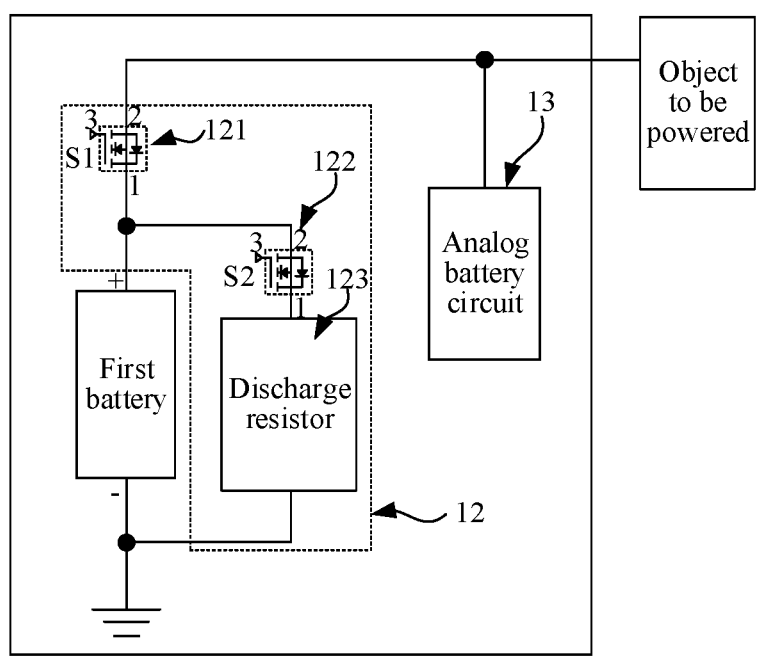
FIG. 4 is a block diagram of another battery module according to some embodiments of the present disclosure.

In practical applications, the object to be powered may need to be uninterruptedly powered, and during the discharging of the first battery 11, as shown by T21 and T23 in FIG. 3, the first battery 11 cannot supply power to the object to be powered during this period of time, causing that the object to be powered may be turned off. To this end, the present embodiment further provides a battery module. Referring to FIG. 4, based on the battery module shown in FIG. 1 to FIG. 3, an analog battery circuit 13 is also included. The analog battery circuit 13 may be connected to the discharge circuit and configured to replace the first battery 11 to supply power outward during the discharging of the first battery 11 by the discharge circuit 12, thereby ensuring that the object to be powered can be continuously powered.

Figure 5:
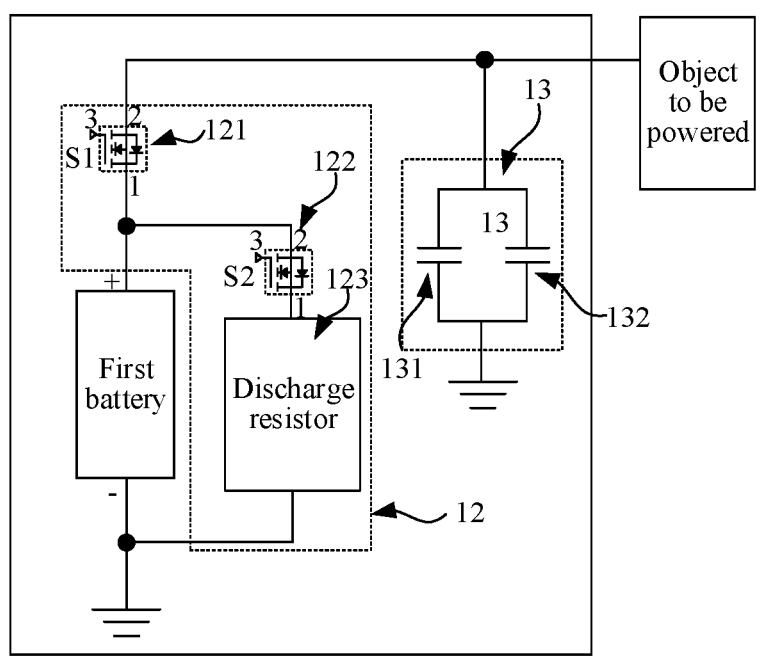
FIG. 5 is a circuit diagram of another battery module according to some embodiments of the present disclosure.

In some embodiments, the analog battery circuit 13 may include at least one capacitor. One end (such as a positive electrode) of each of the at least one capacitor may be connected to the discharge circuit 12 and the other end (such as a negative electrode) may be grounded. Considering that the capacitor may be integrated into the battery module 10, at least one capacitor may be selected as a capacitor having a small volume and a large capacity, which is not limited herein. FIG. 5 is a circuit diagram of a battery module according to some embodiments of the present disclosure. Referring to FIG. 5, for example, the analog battery circuit 13 includes two capacitors. One end of the capacitor 131 and one end of the capacitor 132 are connected to the discharge circuit 12, respectively. The other end of the capacitor 131 and the other end of the capacitor 132 are grounded, respectively. Thus, during the discharging of the first battery 11 by the discharge circuit 12, the capacitor 131 and the capacitor 132 may simultaneously supply power to the object to be powered, and the battery module 10 may continue to supply power to the object to be powered.

It is to be noted that when the first battery 11 supplies power to the object to be powered or when an external power supply charges the first battery 11, the capacitor 131 and the capacitor 132 may be simultaneously charged, thereby ensuring that the capacitor 131 and the capacitor 132 have sufficient power.

Figure 6:
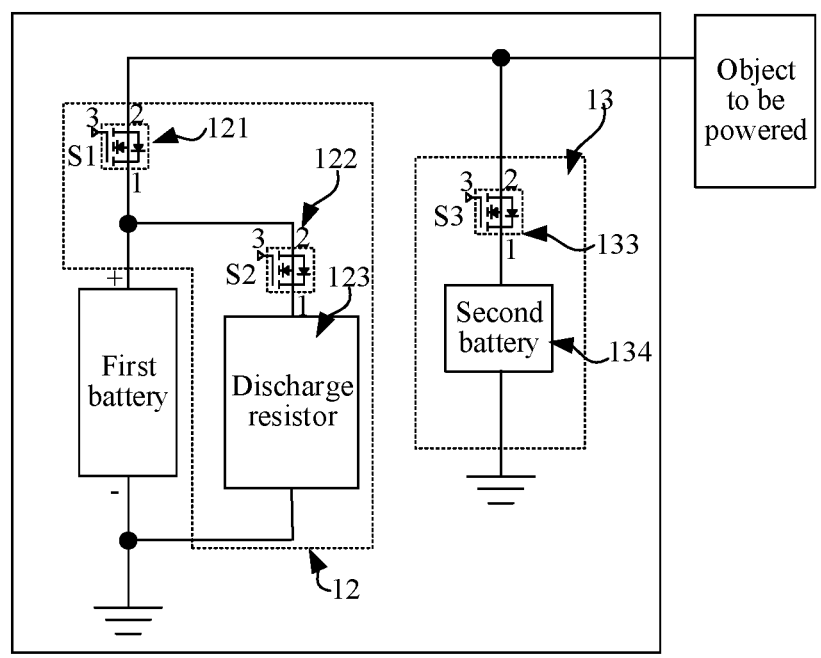
FIG. 6 is a circuit diagram of yet another battery module according to some embodiments of the present disclosure.

In another embodiment, referring to FIG. 6, the analog battery circuit 13 includes a third switching component 133 and a second battery 134. A second end (indicated by reference numeral 2) of the third switching component 133 may be connected to the discharge circuit 12, a first end (indicated by reference numeral 1) of the third switching component 133 may be connected to a positive electrode of the second battery 134, a control end (indicated by reference numeral 3) of the third switching component 133 is configured to receive a third control signal, and a negative electrode of the second battery 134 may be grounded.

The control end 3 of the third switching component 133 may conduct, after receiving the third control signal, the first end 1 and the second end 2 of the third switching component 133 such that the second battery 134 may supply power to the object to be powered.

In an implementation, the second battery 134 may be implemented as a button battery or a large-capacity capacitor, which is not limited herein.

Figure 7:
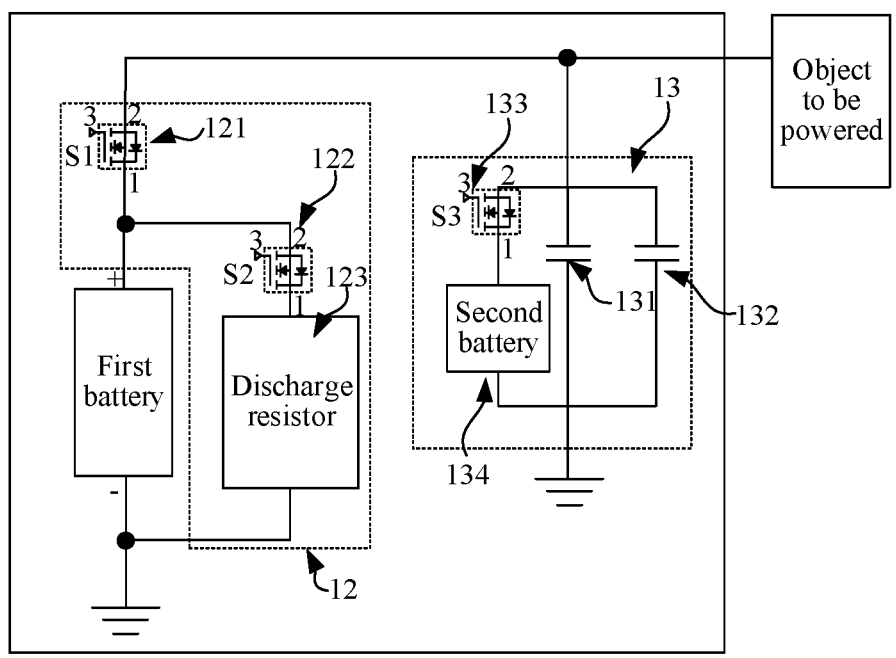
FIG. 7 is a circuit diagram of yet another battery module according to some embodiments of the present disclosure.

In yet another embodiment, referring to FIG. 7, the analog battery circuit 13 may include both the circuit shown in FIG. 5 and the circuit shown in FIG. 6, that is, the analog battery circuit 13 includes a capacitor 131, a capacitor 132, a third switching component 133, and a second battery 134. Please refer to the circuit shown in FIG. 7 for the connection mode. In combination with the discharge characteristics of the capacitor and the button battery, in the present embodiment, after the capacitor 131 and the capacitor 132 are discharged for a set duration, the third switching component 133 may be turned on by the third control signal, and the second battery 134 may continue to supply power to the object to be powered, thereby achieving continuous power supply. By shortening the power supply time of the second battery 134, the switching frequency of the third switching component 133 in the circuit shown in FIG. 7 may be also reduced, which is favorable for reducing the switching loss.

Figure 8:
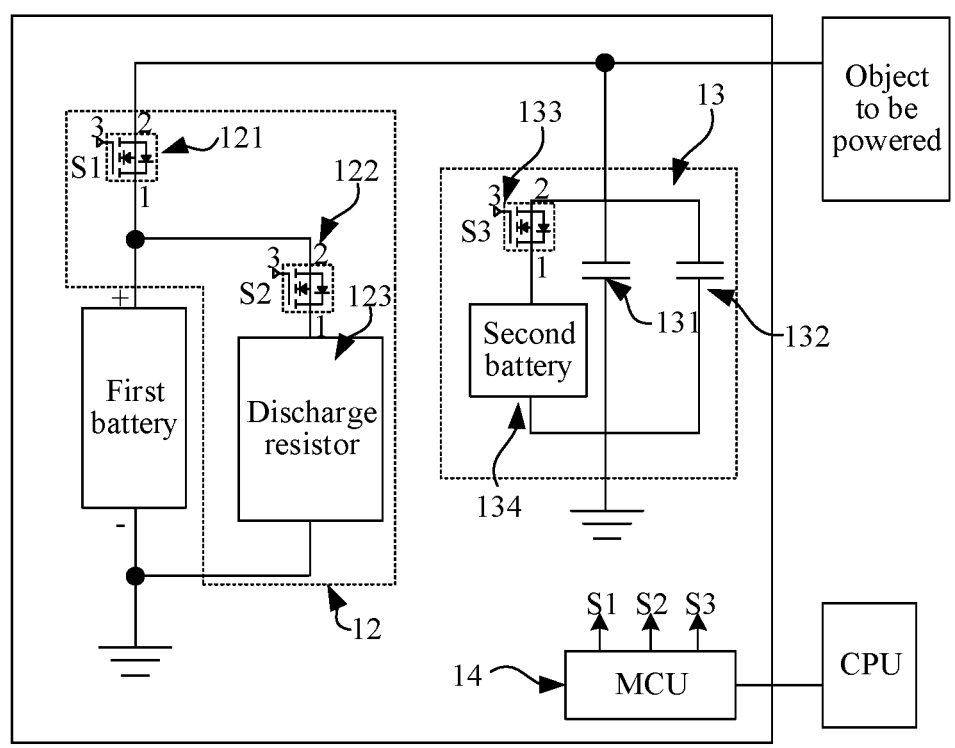
FIG. 8 is a circuit diagram of yet another battery module according to some embodiments of the present disclosure.

In some embodiments, referring to FIG. 8, the battery module 10 further includes a micro controller (indicated by an MCU) 14 that may be respectively connected to the control ends of the first switching component 121 and the second switching component 122 for providing a battery protection control signal that may include a first control signal provided to the first switching component 121 and a second control signal provided to the second switching component 122. When the analog battery circuit 13 includes the third switching component 133, the micro controller 14 may be further connected to the control end of the third switching component 133 for providing a third control signal, that is, the battery protection control signal may further include a third control signal. The first control signal, the second control signal and the third control signal may be provided by the micro controller 14 according to a state parameter of the first battery 11, which will be described in detail in the following embodiments and will not be described here.

In various embodiments of the present disclosure, a discharge circuit may be disposed in a battery module, and the discharge circuit may be connected in parallel to a positive electrode and a negative electrode of a first battery, so that the first battery may be discharged while the first battery is being charged. Therefore, the expansion of the positive and negative electrodes during charging and the electrolyte consumption may be slowed down, and a gate may be prevented from being formed at the positive and negative electrodes to guarantee the life of the first battery. In addition, the arrangement of the analog battery circuit in the battery module may make up for the defect that the battery module cannot supply power to the object to be powered during the discharging process, thereby ensuring the continuity of the power supply of the battery module.

Figure 9:
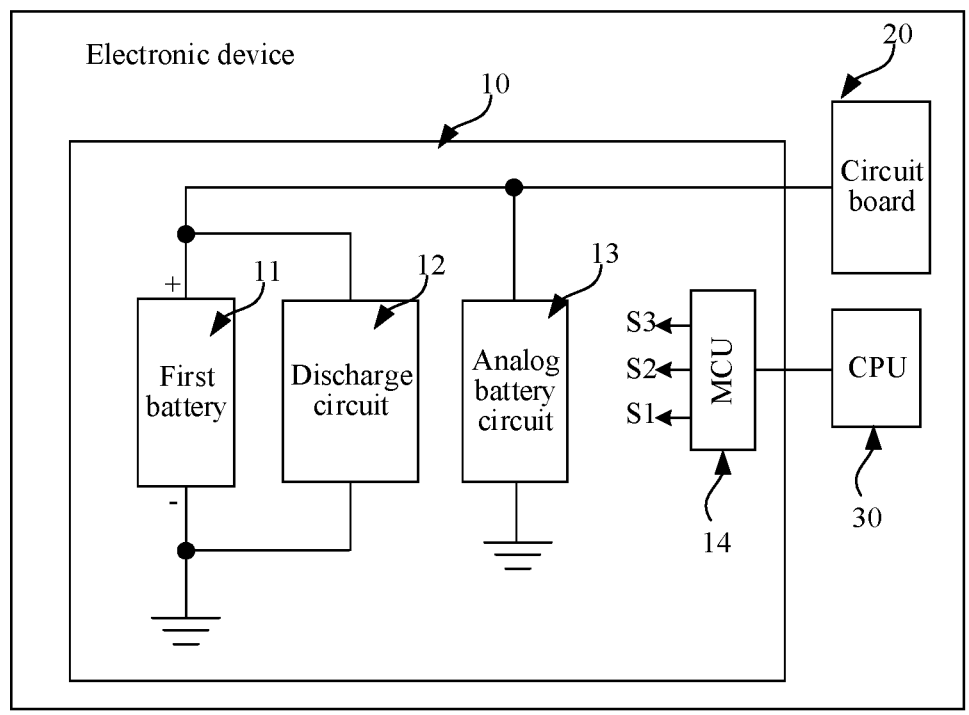
FIG. 9 is a block diagram of an electronic device according to some embodiments of the present disclosure.

FIG. 9 is a block diagram of an electronic device according to some embodiments of the present disclosure.

Referring to FIG. 9, an electronic device includes the battery module 10 shown in FIG. 1 to FIG. 8, a circuit board 20, and a processor 30. The battery module 10 may be connected to the processor 30 and the circuit board 20, respectively, for supplying power to a battery panel according to a control signal of the processor.

In the present embodiment, when the battery module 10 includes a microprocessor 14, the processor 30 may be connected to the microprocessor 14 in the battery module 10 for providing the microprocessor 14 with the charging state of the battery module 10, so that the microprocessor 14 may control the charging or discharging of the first battery 11 and control the discharging of the analog battery circuit 13 according to the charging state.

In the present embodiment, the processor 30 of the electronic device may acquire the state parameter of the first battery 11 by communicating with an operating system, a power chip, or a sensor (not shown) on the battery. The state parameter may include at least one of a battery impedance, an electrolyte concentration, an electrode expansion/contraction coefficient of the first battery 11, a charging duration, or a battery level. The processor 30 may then send the state parameter to the microprocessor 14. The microprocessor 14 may judge whether the first battery 11 needs battery protection according to the state parameter.

For example, the microprocessor 14 may judge whether at least one of the state parameter has reached a preset protection condition. When the battery impedance exceeds a preset impedance threshold, the electrolyte concentration is less than a preset concentration threshold, the electrode expansion/contraction coefficient exceeds a preset coefficient threshold, the charging duration exceeds a preset duration threshold, or the battery level exceeds a preset power threshold, it may be determined that the preset protection condition is reached and that the first battery 11 needs battery protection, otherwise, protection is not needed. When battery protection is needed, the microprocessor 14 may execute a preset battery protection strategy. The thresholds of the protection conditions, such as the preset impedance threshold, the preset concentration threshold, the coefficient threshold, the duration threshold or the power threshold, may be set according to a specific scenario, which is not limited herein.

The preset battery protection strategy may include suspending charging of the first battery 11 during charging and controlling the first battery 11 to charge the discharge circuit 12. For example, the microprocessor 14 may acquire a battery protection control signal that may be generated based on a battery protection strategy.

In an example, the battery protection control signal may be a periodic control signal (e.g., a periodic pulse signal) for periodically suspending charging of the first battery 11 and controlling the first battery 11 to charge the discharge circuit 12 and then continuing to charge the first battery 11. For the process of periodically controlling the charging and discharging of the first battery 11, reference may be made to the embodiments shown in FIG. 8, and details are not described herein again.

In view of the fact that the state parameter of the first battery 11 may vary, in one example, the microprocessor 14 may dynamically adjust the period of the battery protection control signal through a preset deep learning algorithm. For example, the battery protection control signal is a pulse signal, the duty ratio of the pulse signal in each period may be generated by a deep learning algorithm, thereby dynamically adjusting the time for charging and discharging the first battery 11 in each period and equalizing the charging efficiency and life of the first battery 11. The deep learning algorithm may include a neural network algorithm and the like. Other algorithms in the related art may also be used, which is not limited herein.

It will be appreciated that the microprocessor 14 may suspend charging of the first battery 11 and control the first battery 11 to charge the discharge circuit 12 while executing a preset battery protection strategy. Then, the microprocessor 14 may judge whether the state parameter of the first battery 11 reaches a preset charging condition, and when the state parameter of the first battery 11 reaches the charging condition, charging of the first battery 11 may be continued.

For example, the state parameter may be a charging duration. Referring to FIG. 3, a duration threshold may include a first duration threshold T1 and a second duration threshold T2. Then, the microprocessor 14 may judge whether the present charging duration is greater than the first duration threshold T1.

When the present charging duration is less than the first duration threshold T1, the microprocessor 14 may determine that the first control signal is a first level and output the first level to the first switching component 121, and may determine that the second control signal is a second level and output the second level to the second switching component 122, so as to continuously charge the first battery 11.

When the present charging duration exceeds the first duration threshold T1, the microprocessor 14 may determine to execute a battery protection strategy on the first battery 11. That is, the microprocessor 14 may determine that the first control signal is a first pulse signal, the first pulse signal being a pulse signal S1 in T2 in FIG. 3, and may output the first pulse signal to the first switching component 121, and may determine that the second control signal is a second pulse signal, the second pulse signal being a pulse signal S2 in T2 in FIG. 3 and output the second pulse signal to the second switching component 122, so as to periodically charge and discharge the first battery 11. When the battery protection strategy is executed, the microprocessor 14 may judge whether the state parameter of the first battery 11 exceeds the second duration threshold T2 (i.e., the preset charging condition), and when the state parameter of the first battery 11 exceeds the second duration threshold T2, the microprocessor may continue to charge the first battery 11, and if not, the microprocessor may continue the battery protection strategy.

In some embodiments, when the analog battery circuit 13 includes the third switching component 133, after receiving the state parameter, the microprocessor 14 may determine that the first control signal is a second level, that is, the first switching component 121 needs to be turned off, and may output the first level to the third switching component 133 to cause the analog battery circuit 13 to supply power to the object to be powered.

It is to be noted that when the micro controller 14 is not included in the battery portion 10, the processor 30 may send control signals to the first switching component 121, the second switching component 122 and the third switching component 133 respectively according to a time sequence according to which the micro controller 14 sends the control signals, thereby achieving the control over the battery module 10 by the microprocessor 14. The corresponding solution falls within the scope of protection of the present application, which is not limited herein.

Figure 10:
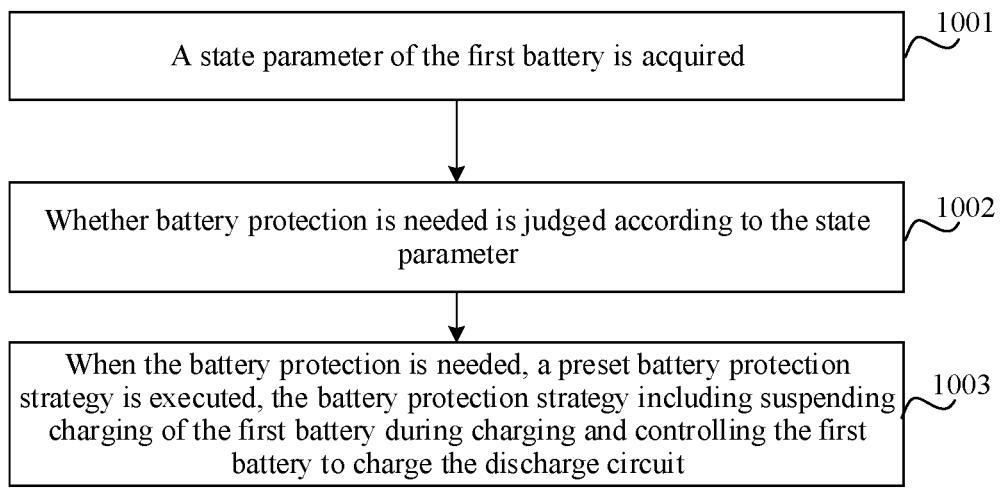
FIG. 10 is a first flowchart of a charging method according to some embodiments of the present disclosure.

Based on the above embodiments of the battery module and the electronic device, some embodiments of the present disclosure further provide a charging method. Referring to FIG. 10, the method may include the following operations.

In operation 1001, a state parameter of the first battery is acquired.

In operation 1002, whether battery protection is needed is judged according to the state parameter.

In operation 1003, when the battery protection is needed, a preset battery protection strategy is executed, the battery protection strategy including suspending charging of the first battery during charging and controlling the first battery to charge the discharge circuit.

Figure 11:
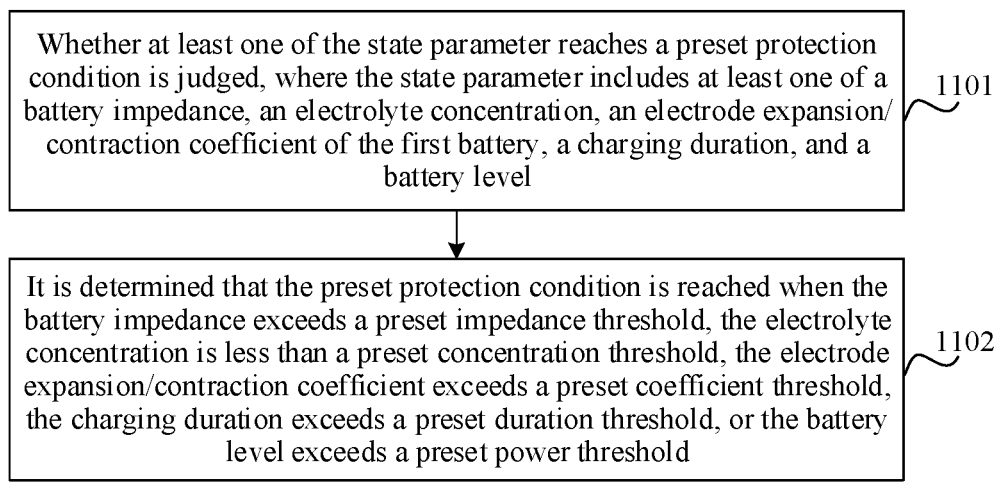
FIG. 11 is a second flowchart of a charging method according to some embodiments of the present disclosure.

Referring to FIG. 11, in operation 1002, the operation that a micro controller judges whether battery protection is needed according to the state parameter may include the following operations.

In operation 1101, whether at least one of the state parameters reaches a preset protection condition is judged, where the state parameter may include at least one of a battery impedance, an electrolyte concentration, an electrode expansion/contraction coefficient of the first battery, a charging duration, and a battery level.

In operation 1102, when the battery impedance exceeds a preset impedance threshold, the electrolyte concentration is less than a preset concentration threshold, the electrode expansion/contraction coefficient exceeds a preset coefficient threshold, the charging duration exceeds a preset duration threshold, or the battery level exceeds a preset power threshold, it is determined that the preset protection condition is reached.

Figures 12, 13, 14:
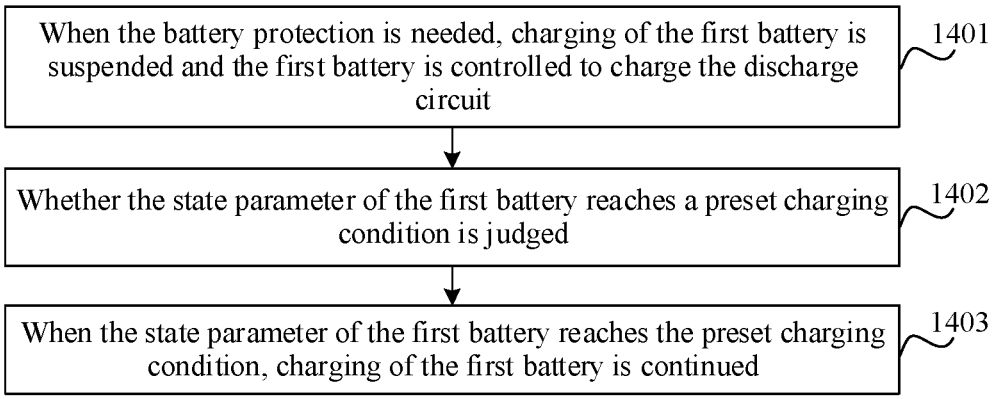
FIG. 12 is a third flowchart of a charging method according to some embodiments of the present disclosure.
FIG. 13 is a fourth flowchart of a charging method according to some embodiments of the present disclosure.
FIG. 14 is a fifth flowchart of a charging method according to some embodiments of the present disclosure.

Referring to FIG. 12, in operation 1003, the operation that the micro controller executes a preset battery protection strategy may include the following operation.

In operation 1201, a battery protection control signal is acquired, the battery protection control signal being a periodic control signal for periodically suspending charging of the first battery and controlling the first battery to charge the discharge circuit and continuing to charge the first battery.

Referring to FIG. 13, the charging method may further include the following operation.

In operation 1301, the period of the battery protection control signal is adjusted dynamically through a preset deep learning algorithm.

Referring to FIG. 14, in operation 1003, the operation that the micro controller executes a preset battery protection strategy may further include the following operations.

In operation 1401, when the battery protection is needed, charging of the first battery is suspended and the first battery is controlled to charge the discharge circuit.

In operation 1402, whether the state parameter of the first battery reaches a preset charging condition is judged.

In operation 1403, when the state parameter of the first battery reaches the preset charging condition, charging of the first battery is continued.

It is to be noted that the charging method shown in the present embodiment has been described in detail in the working process of the battery module and the electronic device in the above embodiments, and details are not described herein again.

Figure 15:
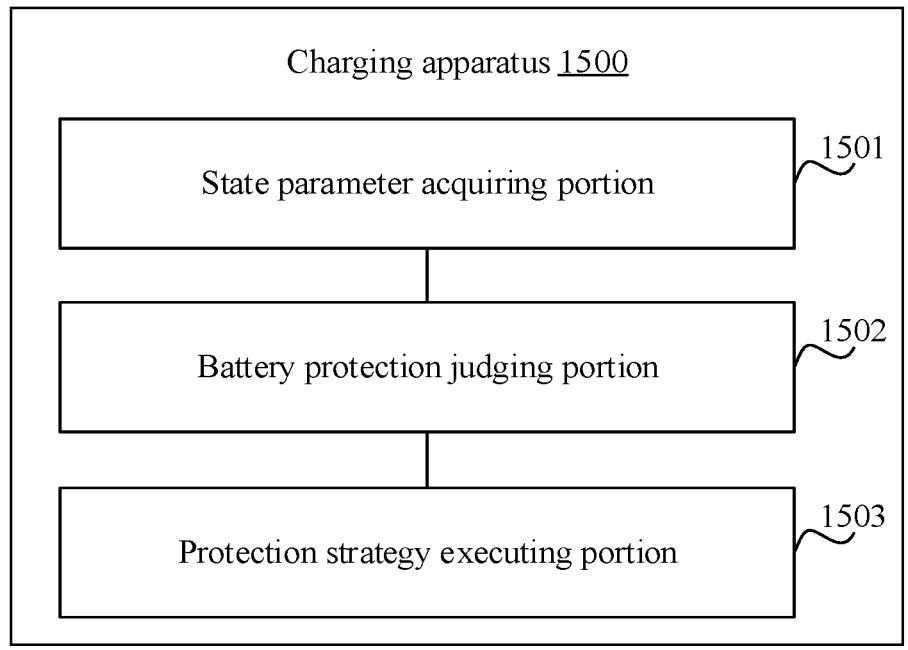
FIG. 15 is a first block diagram of a charging apparatus according to some embodiments of the present disclosure.

FIG. 15 is a block diagram of a charging apparatus according to some embodiments of the present disclosure.

Referring to FIG. 15, a charging apparatus 1500 includes a state parameter acquiring portion 1501, a battery protection judging portion 1502 and a protection strategy executing portion 1503.

The state parameter acquiring portion 1501 is configured to acquire a state parameter of the first battery.

The battery protection judging portion 1502 is configured to judge whether battery protection is needed according to the state parameter.

The protection strategy executing portion 1503 is configured to execute, when the battery protection is needed, a preset battery protection strategy, the battery protection strategy including suspending charging of the first battery during charging and controlling the first battery to charge the discharge circuit.

Figure 16:
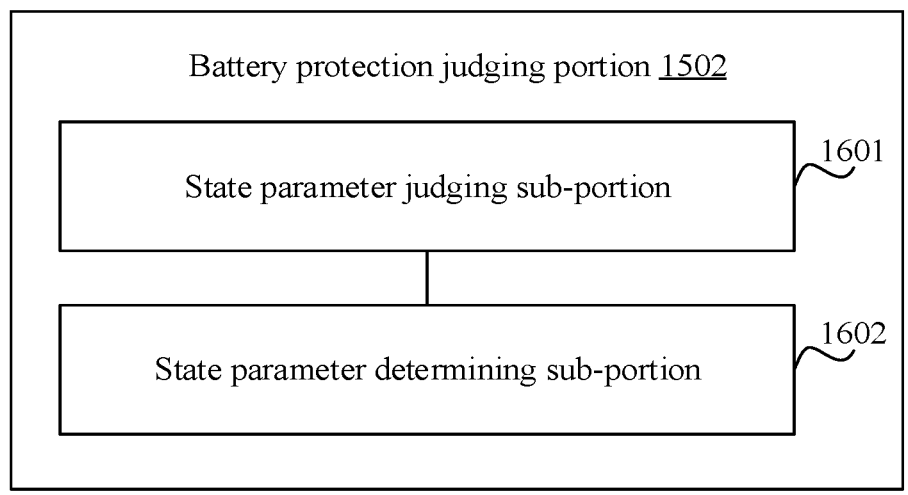
FIG. 16 is a second block diagram of a charging apparatus according to some embodiments of the present disclosure.

Referring to FIG. 16, on the basis of the charging apparatus shown in FIG. 15, the battery protection judging portion 1502 may include a state parameter judging sub-portion 1601 and a state parameter determining sub-portion 1602.

The state parameter judging sub-portion 1601 is configured to determine whether at least one of the state parameters reaches a preset protection condition, where the state parameter includes at least one of a battery impedance, an electrolyte concentration, an electrode expansion/contraction coefficient of the first battery, a charging duration, and a battery level.

The state parameter determining sub-portion 1602 is configured to determine that the preset protection condition is reached, when the battery impedance exceeds a preset impedance threshold, the electrolyte concentration is less than a preset concentration threshold, the electrode expansion/contraction coefficient exceeds a preset coefficient threshold, the charging duration exceeds a preset duration threshold, or the battery level exceeds a preset power threshold.

Figure 17:
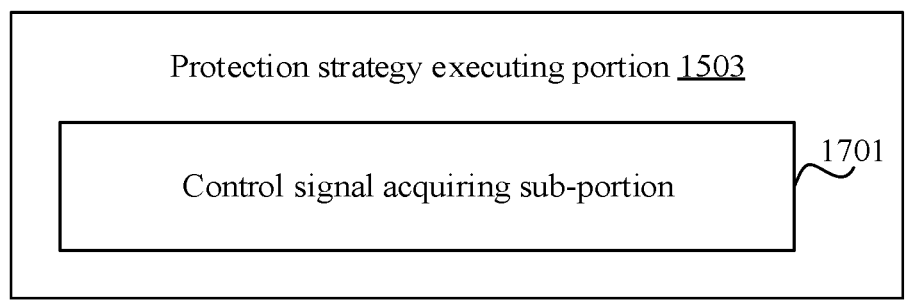
FIG. 17 is a third block diagram of a charging apparatus according to some embodiments of the present disclosure.

Referring to FIG. 17, on the basis of the charging apparatus shown in FIG. 15 or FIG. 16, the protection strategy executing portion 1503 may include a control signal acquiring sub-portion 1701.

The control signal acquiring sub-portion 1701 is configured to acquire a battery protection control signal, the battery protection control signal being a periodic control signal for periodically suspending charging of the first battery and controlling the first battery to charge the discharge circuit and continuing to charge the first battery.

Figure 18:
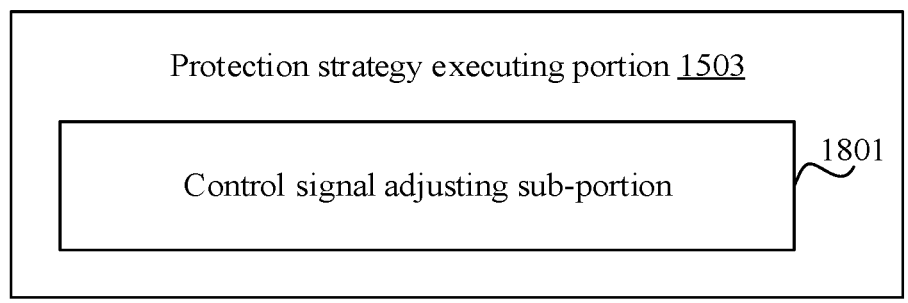
FIG. 18 is a fourth block diagram of a charging apparatus according to some embodiments of the present disclosure.

Referring to FIG. 18, on the basis of the charging apparatus shown in FIG. 17, the protection strategy executing portion 1503 may further include a control signal adjusting sub-portion 1801.

The control signal adjusting sub-portion 1801 is configured to adjust the period of the battery protection control signal dynamically through a preset deep learning algorithm.

Figure 19:
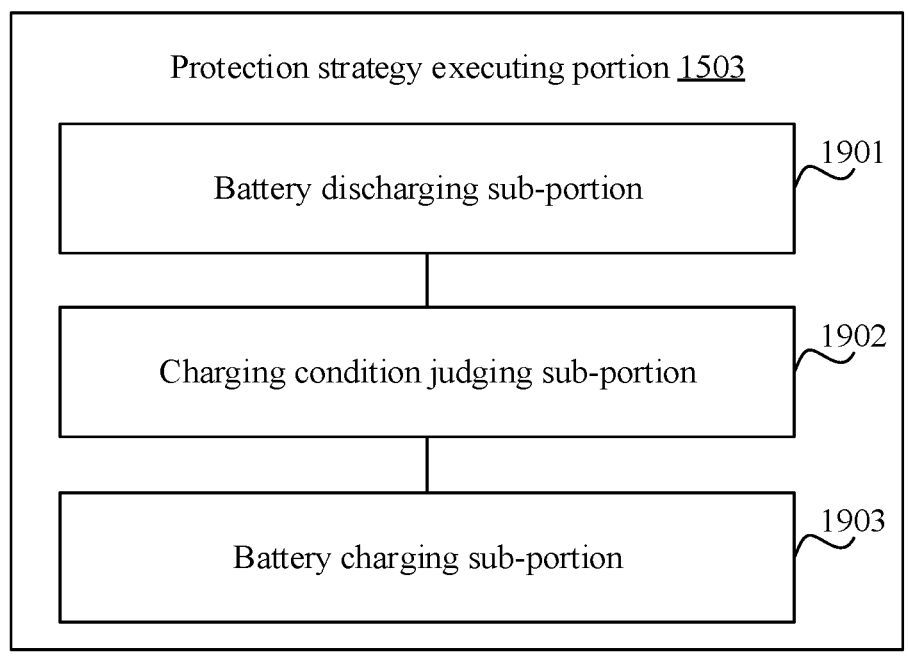
FIG. 19 is a fifth block diagram of a charging apparatus according to some embodiments of the present disclosure.

Referring to FIG. 19, on the basis of the charging apparatus shown in FIG. 15 or FIG. 16, the protection strategy executing portion 1503 may include a battery discharging sub-portion 1901, a charging condition judging sub-portion 1902 and a battery charging sub-portion 1903.

The battery discharging sub-portion 1901 is configured to, when the battery protection is needed, suspend charging of the first battery and control the first battery to charge the discharge circuit.

The charging condition judging sub-portion 1902 is configured to judge whether the state parameter of the first battery reaches a preset charging condition.

The battery charging sub-portion 1903 is configured to continue to charge the first battery, when the state parameter of the first battery reaches the preset charging condition.

It is to be understood that the charging apparatus provided by the embodiments of the present invention corresponds to the above charging method. The details may refer to each embodiment of the method, and will not be described herein again.

Figure 20:
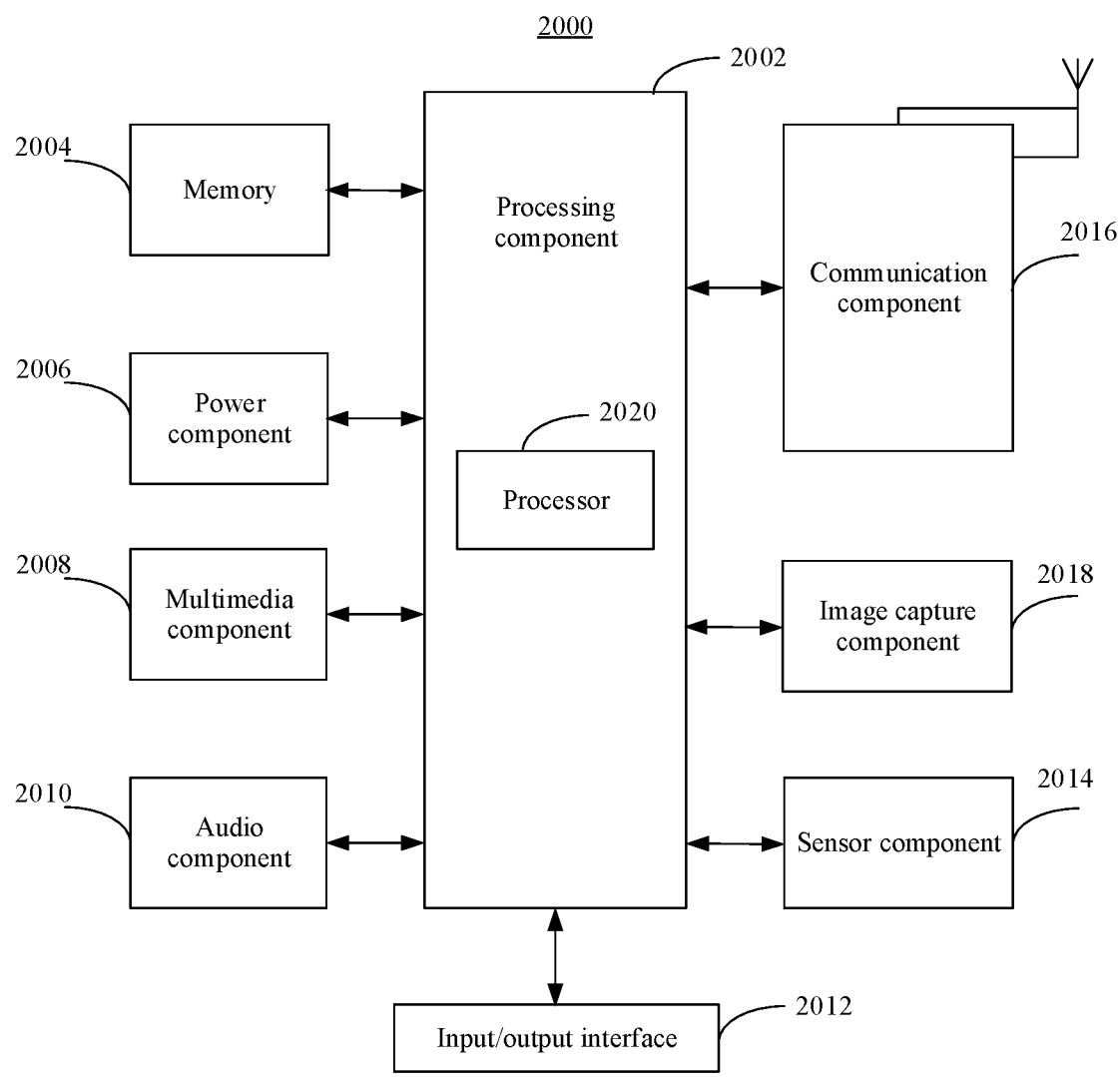
FIG. 20 is a block diagram of an electronic device according to some embodiments of the present disclosure.

FIG. 20 is a block diagram of an electronic device according to some embodiments of the present disclosure. For example, the electronic device 2000 may be a smart phone, a computer, a digital broadcast terminal, a tablet device, a medical device, exercise equipment, a personal digital assistant, or the like.

Referring to FIG. 20, the electronic device 2000 may include one or more of the following components: a processing component 2002, a memory 2004, a power component 2006, a multimedia component 2008, an audio component 2010, an input/output (I/O) interface 2012, a sensor component 2014, a communication component 2016, and an image capture component 2018.

The processing component 2002 is typically configured to control overall operations of the electronic device 2000, such as the operations associated with display, telephone calls, data communications, camera operations, and recording operations. The processing component 2002 may include one or more processors 2020 to execute instructions. Moreover, the processing component 2002 may include one or more portions which facilitate the interaction between the processing component 2002 and other components. For example, the processing component 2002 may include a multimedia portion to facilitate the interaction between the multimedia component 2008 and the processing component 2002. When interacting, the processor 2020 may read executable instructions from the memory 2004 to implement the operations of the method shown in FIG. 10 to FIG. 14.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 2004 is configured to store various types of data to support the operation of the electronic device 2000. Examples of such data may include instructions for any applications or methods operated on the electronic device 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 may provide power to various components of the electronic device 2000. The power component 2006 may include a power management system, one or more power sources, and any other components associated with the generation, management, and distribution of power in the electronic device 2000. Moreover, the power component 2006 may include the battery modules shown in FIG. 1 to FIG. 8. The details may refer to the content of the corresponding embodiments.

The multimedia component 2008 may include a screen of an output interface provided between the electronic device 2000 and a target object. In some embodiments, the screen may include a liquid crystal display (LCD) and a touch panel (TP). In some embodiments, organic light-emitting diode (OLED) or other types of displays can be employed. If the screen includes the touch panel, the screen may be implemented as a touch screen to receive input signals from the target object. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 2010 is configured to output and/or input audio signals. For example, the audio component 2010 includes a microphone (MIC) configured to receive an external audio signal when the electronic device 2000 is in an operation mode, such as a call mode, a recording mode, and a voice recognition mode. The received audio signal may be further stored in the memory 2004 or transmitted via the communication component 2016. In some embodiments, the audio component 2010 may further include a speaker to output audio signals.

The I/O interface 2012 is configured to provide an interface between the processing component 2002 and peripheral interface portions, such as a keyboard, a click wheel, buttons, and the like.

The sensor component 2014 may include one or more sensors to provide status assessments of various aspects of the electronic device 2000. For example, the sensor component 2014 may detect an open/closed status of the electronic device 2000, relative positioning of components, e.g., the display and the keypad, of the electronic device 2000, a change in position of the electronic device 400 or a component, a presence or absence of target object contact with the electronic device 2000, an orientation or an acceleration/deceleration of the electronic device 2000, and a change in temperature of the electronic device 2000.

The communication component 2016 is configured to facilitate communication, wired or wirelessly, between the electronic device 2000 and other devices. The electronic device 2000 may access a wireless network based on a communication standard, such as Wireless Fidelity (Wi-Fi), 2nd-Generation (2G), 3rd-Generation (3G), 4th-Generation (4G), or 5th-Generation (5G), or a combination thereof. In some embodiments of the present disclosure, the communication component 2016 may be configured to receive a broadcast signal or broadcast associated information from an external broadcast management system via a broadcast channel. In some embodiments, the communication component 2016 may further include a near field communication (NFC) portion to facilitate short-range communications. For example, the NFC portion may be implemented based on a radio frequency identification (RFID) technology, an infrared data association (IrDA) technology, an ultra-wideband (UWB) technology, a Bluetooth (BT) technology, and other technologies.

In some embodiments, the electronic device 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

A non-transitory computer-readable storage medium can have instructions stored thereon, which executable by a processor of a terminal to enable the terminal to execute the methods of the embodiments described above.

In some embodiments, a non-transitory readable storage medium having instructions stored thereon is provided, such as the memory 2004 containing instructions. The instructions are executable by the processor 2020 in the electronic device 2000 for performing the operations of the method shown in FIG. 10, FIG. 11, FIG. 12, FIG. 13, and FIG. 14. The readable storage medium may be a ROM, a CD-ROM, a magnetic tape, a floppy disc, an optical data storage device, and the like.

In some embodiments, a deep learning algorithm may be also provided to dynamically adjust the period of the battery protection control signal according to the state parameter of the first battery.

In the embodiments of the present disclosure, a discharge circuit may be disposed in a battery module, and the discharge circuit may be connected in parallel to a positive electrode and a negative electrode of a first battery, so that the first battery may be discharged while being charged. Therefore, the expansion of the positive and negative electrodes during charging and the electrolyte consumption may be slowed down, and a gate may be prevented from being formed at the positive and negative electrodes to ensure the life of the first battery.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A battery module, comprising an analog battery circuit, a first battery and a discharge circuit, wherein
the discharge circuit is in a parallel connection with a positive electrode and a negative electrode of the first battery,
the discharge circuit is configured to discharge the first battery according to a control signal during charging of the first battery, and
the analog battery circuit is in parallel connection with the discharge circuit for replacing the first battery to supply power to the object to be powered when the first battery charges the discharge circuit,
wherein
the analog battery circuit further comprises a third switching component and a second battery, a second end of the third switching component is in parallel connection with the discharge circuit, a first end of the third switching component is in parallel connection with a positive electrode of the second battery, and a control end of the third switching component is configured to receive a third control signal;
a negative electrode of the second battery is grounded; and
the control end of the third switching component is configured to conduct, after receiving the third control signal, the first end and the second end of the third switching component to enable the second battery to supply power to the object to be powered.

2. The battery module of claim 1, wherein the discharge circuit comprises a first switching component, a second switching component and a discharge resistor;
a first end of the first switching component is in parallel connection with the positive electrode of the first battery, a second end of the first switching component is in parallel connection with an object to be powered, a control end of the first switching component is configured to receive a first control signal and to conduct, after receiving the first control signal, the first end and the second end of the first switching component to charge the first battery;
a second end of the second switching component is in parallel connection with the positive electrode of the first battery, a first end of the second switching component is in parallel connection with a first end of the discharge resistor, a control end of the second switching component is configured to receive a second control signal and to conduct, after receiving the second control signal, the first end and the second end of the second switching component to enable the first battery to charge the discharge resistor; and the first switching component and the second switching component having opposite switching states; and
a second end of the discharge resistor is in parallel connection with the negative electrode of the first battery.

3. The battery module of claim 2, further comprising a microprocessor, wherein
the microprocessor is in parallel connection with the control end of the first switching component and the control end of the second switching component respectively for providing the first control signal and the second control signal.

4. The battery module of claim 1, wherein the analog battery circuit comprises at least one capacitor, one end of each of the at least one capacitor is in parallel connection with the discharge circuit and the other end is grounded.

5. The battery module of claim 1, wherein the control end of the third switching component is configured to receive the third control signal after the at least one capacitor is discharged for a set duration.

* * * * *